July 7, 1964  J. C. McROBERTS  3,139,892
SERVO GOVERNOR HAVING EMERGENCY CONTROL MEANS
Filed Dec. 22, 1954
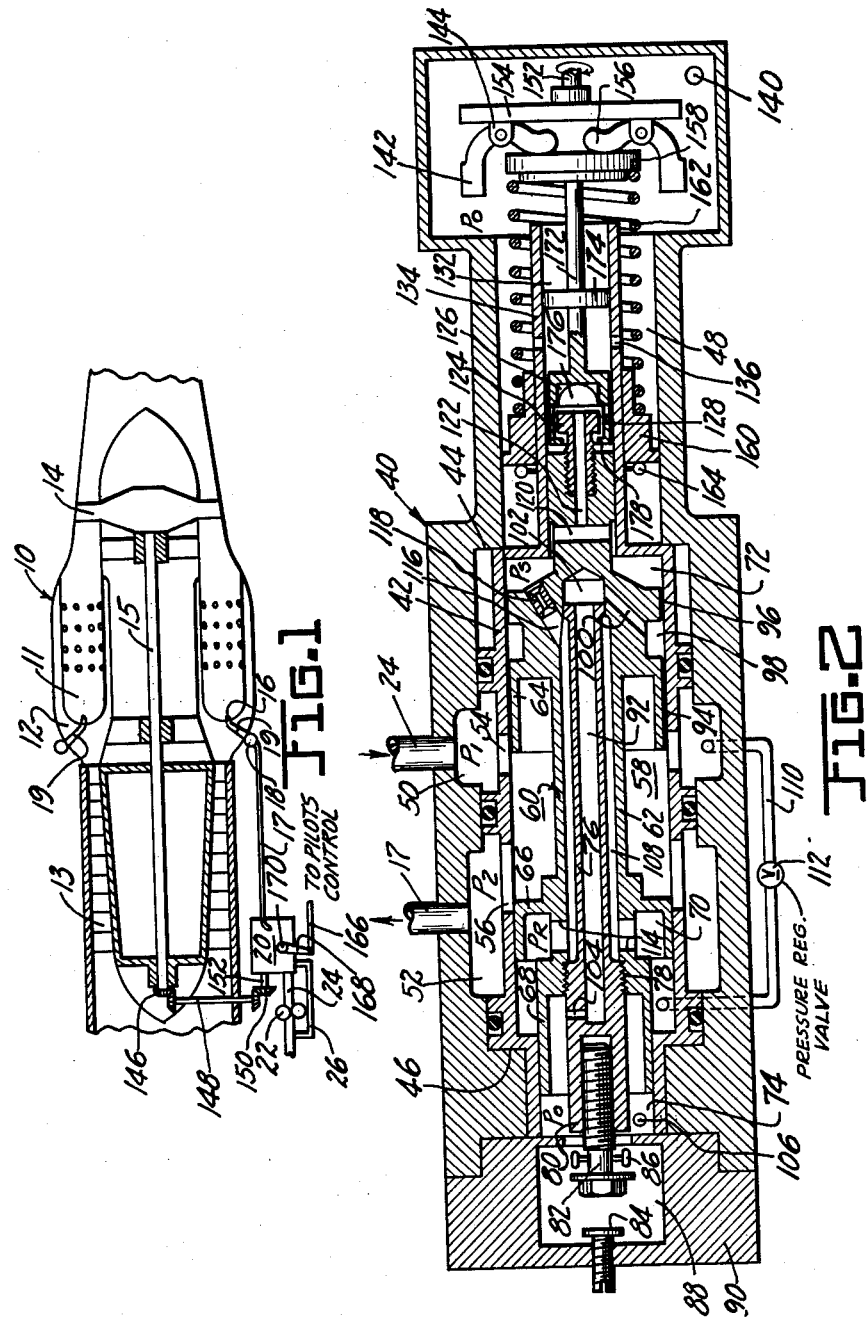
INVENTOR.
JAMES C. McROBERTS
BY
J.C. Wiesler
ATTORNEY United States Patent Office
3,139,892
Patented July 7, 1964

3,139,892
SERVO GOVERNOR HAVING EMERGENCY
CONTROL MEANS
James C. McRoberts, South Bend, Ind., assignor to The
Bendix Corporation, a corporation of Delaware
Filed Dec. 22, 1954, Ser. No. 477,036
7 Claims. (Cl. 137—18)

This invention relates to an engine governor mechanism and more specifically to a proportional type governor having a power driven governor valve particularly adapted for use in a fuel feed system for gas turbine engines.

Direct acting type governors, have heretofore enjoyed the advantage of relative simplicity over power driven governors controlled by servo-mechanisms. Direct acting governors have, however, certain inherent disadvantages such as susceptibility to dirt or other foreign particles in the fuel which may cause sticky governor action, a tendency towards dynamic or static hydraulic pressure unbalance across the governor valve, governor valve hysteresis if valve clearances are kept reasonably close so as to minimize fuel leakage at the ends of the valve, a relatively large gravity or "G" effect due to the necessary relatively large mass of the governor parts, and substantially less than optimum response time. On the other hand, servo-operated governors have heretofore generally suffered disadvantages such as undue complexity, and the lack of a direct acting standby or emergency governor control means automatically operative in case of a failure of the servo-mechanism.

In application Serial No. 446,335, filed July 28, 1954 in the name of Andrew A. Kuzmitz (common assignee), now abandoned, in favor of continuation application Serial No. 682,570, filed September 5, 1957 there is disclosed and claimed a relatively simple servo type governor which avoids or tends to minimize all of the above mentioned disadvantages to which both direct acting governors and servo actuated governors have heretofore been subject. My invention constitutes an improvement of the governor mechanism disclosed in said application.

It is therefore a primary object of this invention to provide an improved servo type governor which avoids or minimizes all of the above mentioned disadvantages to which both direct acting governors and servo actuated governors have heretofore been subject.

Another important object of this invention is to provide a highly compact and relatively simple servo governor which provides improved standby or emergency governor control means automatically operative in case of a failure of the servo-mechanism.

The foregoing and other objects and advantages will become apparent in view of the following description taken in conjunction with the drawings, wherein:

FIGURE 1 is a sectional view of a turbo-jet engine equipped with a fuel feed and power control device which includes the applicant's governor; and FIGURE 2 is a schematic sectional view of a govenor in accordance with the invention.

Referring now to FIGURE 1, a gas turbine engine is generally indicated at numeral 10 and includes a series of annularly disposed combustion chambers 11 mounted in a casing having a header or air intake section 12, and a compressor 13, shown as of the axial flow type, which is driven by means of a turbine 14 through a shaft 15. Each of the combustion chambers is provided with a burner nozzle 16 to which metered fuel is supplied under pressure by way of a conduit 17, a fuel manifold 18 and individual fuel lines 19. The conduit 17 receives metered fuel from a fuel control device generally indicated at 20, said device including the applicant's governor as shown in FIGURE 2. A pump 22 of the positive displacement type supplies fuel under pressure to fuel control 20 through a conduit 24, a portion of which fuel may be by-passed back to the pump inlet through a conduit 26.

Referring now to FIGURE 2, a governor housing is shown at 40 which contains a hollow sleeve member 42 held in fixed position therein between housing abutments 44 and 46, and which defines a chamber 48 in which is housed governor control mechanism, to be hereinafter described. Annular inlet and outlet chambers 50 and 52, respectively, are formed between the sleeve member and the housing, and are respectively connected to fuel inlet conduit 24 at a pressure $P_1$ and to fuel outlet conduit 17 at a pressure $P_2$, communication between said annular chambers being effected by a plurality of annularly arranged inlet ports 54 and outlet ports 56 formed in the sleeve member, and by a governor chamber 58 formed between the sleeve member and a governor valve 60 which is reciprocable therein.

The governor valve 60 includes a hollow outer valve stem 62 formed integrally with cup-shaped piston like elements 64, 66 and 68, which elements are arranged in fixed spaced relation to each other to define, along with sleeve member 42 and outer valve stem 62, the governor chamber 58, a regulated pressure chamber 70, a servo pressure chamber 72 and a pump inlet pressure chamber 74. A hollow inner valve stem 76 is suitably connected to element 68 at 78, and terminates at the left end thereof in a tapped section 80 which receives a stud 82 movable between an adjustable minimum fuel flow stop 84 and a bifurcated variable maximum fuel flow stop 86 in a chamber 88 formed within a housing cover plate 90.

The inner valve stem 76 defines a fuel leakage flow passage 92, which connects governor chamber 58 and servo pressure chamber 72 to by-pass conduit 26 by way of annular valve clearance passages 94 and 96, an annular chamber 98 formed within the valve metering element 64, a passage and chamber 100 and 102, respectively, also formed within valve element 64, a passage 104, pump inlet pressure chamber 74, and a conduit 106. An annular passage 108 is formed between inner valve stem 76 and outer valve stem 62 and connects annular chamber 50 to conduit 26 by way of a conduit 110 having a constant discharge pressure regulator valve 112 therein, the regulated pressure chamber 70, ports 114 formed in outer valve stem 62 between piston elements 66 and 68, a passage and restriction 116 and 118 in valve element 64, the servo pressure chamber 72, valve stem passages 120 and 122, a servo valve orifice member 124, a servo valve chamber 126 formed within a ported cup-shaped member 128, a chamber 132 formed within a stepped-down cylindrical extension 134 of sleeve member 42, a plurality of annularly arranged ports 136 formed in sleeve extension 134, the chamber 48, and a conduit 140.

The governor control mechanism housed within chamber 48 includes a pair of centrifugal weights 142 which are pivotally mounted on brackets 144 and which are adapted to be rotatably driven by the engine by means of a bevel gear 146, a geared member 148, a bevel gear 150 in mesh with one end of member 148, and a governor drive shaft 152, on one end of which is mounted the gear 150 and on the opposite end of which is mounted a drive plate 154 to which brackets 144 are attached. The centrifugal weights 142 are made integral with foot members 156, which are adapted to continuously abut a spring retainer member 158 resiliently connected to a governor spring setting member 160 by a governor spring 162. Spring setting member 160 is slidably mounted on the outer surface of sleeve extension 134 and may be actuated in an axial direction to vary the degree of compression of governor spring 162 by means of a bifurcated governor lever 164, suitably mounted in the left end of chamber 48 and actuable by means of a pilot control lever, not shown, which is connected thereto by a link 166, a lever 168 and a shaft 170 (see FIGURE 1). Spring retainer member 158 is connected to the servo valve member 128 by means of a rod 172, on which is mounted a guide land 174, said member 128 providing a housing for the orifice member 124 and a floating half-ball type servo valve 176. An annular lip 178 is formed on the left end of member 128.

A highly compact, efficient, and relatively simple servo-type governor mechanism may be designed in accordance with the foregoing description of structure if, as is preferred, all of the major elements which are mounted for relative movement with respect to sleeve member 42, including governor valve means 60, servo valve and orifice means 176, 124, and the centrifugal weight mounting plate 154, are arranged in substantial coaxial relation with each other.

During operation, valve element 64 of governor valve 60 is positionally controlled within sleeve member 42 to vary the effective area of metering valve ports 54, by the governer mechanism contained within chamber 48 during any given pilot selected condition of steady state engine operation and during governor cut-off operation, by the maximum flow-valve stop 86 during acceleration of the engine prior to governor cut-off action, and by the fixed minimum valve stop 84 during conditions of engine deceleration.

The fuel metering pressure differential across metering ports 54 is preferably maintained at a constant value irrespective of variations in engine operating conditions by constant pressure differential regulator valve means, not shown, which is preferably of the type disclosed in the copending application of Harry C. Zeisloft, Serial No. 168,294 filed December 22, 1961, which is a division of application Serial No. 684,368 filed September 16, 1957, now abandoned, which in turn is a continuation-in-whole of application Serial No. 248,402, filed September 26, 1951 (common assignee) also now abandoned.

The position of the maximum valve stop 86 is continuously controlled as a function of certain existing engine operating parameters or variables, such as engine speed and compressor inlet temperature, by mechanism such as is disclosed and claimed in the copending application of Harry C. Zeisloft, supra, said stop being effective during an acceleration of the engine to a new selected speed to override the instantaneous speed change demand of the pilot and independently control the rate of opening movement of valve 60 to limit the rate of change of fuel flow in accordance with certain engine parameters or variables up to the selected speed, at which speed the governor mechanism shown in chamber 48 functions to cause a closing movement of valve 60 until a steady state condition of operation exists, as more fully hereinafter explained.

Assume that the engine has been started and accelerated to a condition of equilibrium or steady state operation in the mid-speed range. The selection of the assumed condition of engine operation is controlled by the pilot who, by means of a control lever, link 166 and lever 168, may actuate the bifurcated governor lever 164 and spring setting member 160 to compress the governor spring 162 a predetermined amount, thereby selecting a desired engine speed. At the assumed condition of equilibrium, the force generated by the governor weights 142 exactly balances the governor spring force, in which condition the servo valve housing 128 maintains the half-ball servo valve 176 in a fixed position with respect to orifice member 124. This results in a fixed area relationship between restriction 118 and orifice 124 which maintains a value of pressure $P_S$ in servo pressure chamber 72, to establish a fixed position of valve element 64 with respect to ports 54. The parts as shown in FIGURE 2 are positioned relative to each other to illustrate the condition of equilibrium operation such as above described; i.e. valve control stud 82 is floating between the maximum and minimum valve stops, the centrifugal weight force output is in balance with governor spring 162, and servo valve 176 is positioned with respect to orifice member 124 to equilibrate the valve closing force resulting from controlled servo pressure $P_S$ with the valve opening force resulting from regulated pressure $P_R$.

In practice, it has been found that very good valve response time and valve stability are attained if the ratio of the net valve area in servo pressure chamber 72 to the net area in regulated pressure chamber 70 is made approximately two to one, and the diameter of restriction 118 is made approximately .028″. This valve area ratio and bleed diameter combination has been found to result in almost instantaneous valve response, following movement of servo valve 176, without valve overshoot or undershoot at equilibrium. Obviously, many other valve area ratio and bleed size combinations may be designed to satisfy certain valve response and stability requirements, and my invention is in no sense restricted to the above exemplary combination. However, the bleed 118 should be held within a certain predetermined range of diameters; if it is too small in diameter good valve stability, but poor response time and dirt problems will result, whereas if the bleed is too large, instantaneous response, but poor stability will result.

If the pilot should desire to accelerate the engine to a higher speed from the aforementioned equilibrium condition, he will actuate lever 168 in a direction to move governor lever 164 rightwardly to compress governor spring 162, thereby actuating servo valve 176 in an open direction with respect to orifice member 124 to upset the equilibrium of the governer, which results in a sudden decrease in $P_S$ pressure due to the increased area ratio between the orifice 124 and bleed 118 and opening movement of governor valve 60 until limited by contact between acceleration lever 86 and stud 82. The acceleration lever 86 is controlled by mechanism, not shown, in such a manner that the rate of opening movement of governor valve 60 controls fuel flow so as to avoid an overtemperature condition at the turbine inlet and compressor surge or stall at a given altitude. During such a transient condition the force of pressure $P_S$ on valve 60 is insufficient to balance the constant net force of the regulated pressure $P_R$ acting on said valve, and fuel flow is increased at a rate which is a function of the rate of change of position of acceleration lever 86 until the speed selected by the pilot is attained.

As the engine approaches selected speed, the force output of weights 142 begins to overcome the governor spring 162 and actuates servo valve 176 leftwardly to produce governor valve cut-off action as said weights fly outwardly about their pivots. It is apparent that during such cut-off action the governor valve follows the movement of servo valve 176, and when equilibrium is reached between weights 142 and spring 162 said servo valve has established that amount of leakage through orifice member 124 which is necessary to equilibrate the net $P_S$ and $P_R$ pressure forces, whereby a fixed position of the governor valve is maintained.

The valve leakage circuit 98, 100, 92, 104, 74 and 106 is provided so that fuel at $P_1$ pressure cannot flow past valve 60 into the servo pressure chamber to vary the value of $P_S$ pressure in an undesirable manner. With this arrangement, $P_S$ pressure will vary solely as a function of the area ratio between restriction 118 and the orifice member 124.

My invention affords an improved mechanical control arrangement for the governor valve 60 in the event that the servo system fails for any reason. If, for example, the pressure regulator valve 112 should fail in closed position, pressures $P_R$ and $P_S$ would both decrease to the value of pump inlet pressure as a result of pressure bleed-off from chambers 70 and 72 to chamber 48. As a result of this drop in pressure in chambers 70 and 72 a balance of the sum of hydraulic forces acting on valve 60 is effected. In other words, under such conditions, no net force external to the governor mechanism contained in chamber 48, except the small frictional force between the valve 60 and sleeve 42, acts on valve 60.

It may therefore be seen that valve 60 is, under such conditions, subject to direct mechanical control by the governor mechanism in chamber 48 without appreciably affecting the operation thereof. My servo powered governor may therefore be said to fail safe; i.e. the governor is designed such that the normal hydraulic connection between the governor mechanism in chamber 48 and governor valve 60 becomes a mechanical connection in the event that the servo system fails; the pilot may still select the same engine operating speeds throughout the permissible range thereof at pilot lever positions corresponding to those at said speeds before the servo failure by actuating resetting member 160 to compress or relax the governor spring, thereby moving lip 178 of servo valve housing 128 into contact with orifice member 124, or servo valve 176 into contact therewith, which manually actuates valve 60 in an accelerating or decelerating direction, respectively. When the engine reaches a new selected speed during acceleration, the weights 142 overcome governor spring 162 and actuate servo valve 176 into contact with orifice member 124 to mechanically move governor valve 60 in a fuel flow decreasing direction until the governor mechanism is in equilibrium, at which time the engine is operating in a steady state condition at the new selected speed.

Contrariwise, as the engine reaches a new selected speed during a deceleration of the engine, the force output of the governor spring begins to overcome the decreasing force output of the centrifugal weights and actuates the lip 178 of servo valve housing 128 into contact with orifice member 124 to mechanically move governor valve 60 in a fuel flow increasing direction until the governor mechanism is in equilibrium, at which time the engine is operating in a steady state condition at the new selected speed.

From the above it is apparent that my invention provides a highly compact servo type engine governor which is designed in such a manner that a failure of the servo system does not cause any loss of engine control.

Although only one specific embodiment of my invention has been described, it will be apparent to those skilled in the art that certain variations in design and relative arrangement of parts may be made without departing from the scope of the invention.

I claim:

1. An engine speed governor comprising an engine speed responsive device, operator controlled means for adjusting said device to select an operating speed for the engine, servo valve means controlled by said device, governor valve means having an associated differential area piston means, a regulated pressure fluid source communicating with said piston means to supply a first actuating pressure thereto, passage means containing a restriction therein connected to said fluid source and operable to transmi a second actuating pressure to said piston means, said first and said second actuating fluid pressures acting in combination to comprise a pressure differential operable to control said differential area piston means, said servo valve means being adapted to vary said pressure differential during a transit in engine speed and to fix said pressure differential during equilibrium operation of the engine at any given speed selected at said operator controlled means, and said servo valve means and said engine speed responsive device being so constructed and arranged with respect to said governor valve means that a predetermined decrease in said pressure differential causes said governor valve means to become mechanically connected to said engine speed responsive device for the purpose of controlling the speed of the engine in an increasing and decreasing direction.

2. An engine speed governor comprising governor valve means for controlling the flow of motive fluid to the engine including piston means responsive solely to fluid pressure forces during normal operation of the governor, a regulated fluid pressure source communicating with said piston means to provide a substantially constant fluid pressure acting on said piston means for moving said valve means in an opening direction, passage means including a restriction therein also connecting said fluid pressure source with said piston means to provide a variable fluid pressure for moving said valve means in a closing direction, and an engine speed responsive device operatively connected to said governor valve means, said operative connection including servo valve means for controlling said variable fluid pressure, said device being so constructed and arranged relative to said governor valve means that a mechanical connection is effected therebetween following a predetermined change in said variable fluid pressure.

3. An engine speed governor comprising governor valve means for controlling the flow of motive fluid to the engine including differential area piston means, first and second chamber means formed on opposite sides of said piston means, a fluid source containing a fluid of substantially constant pressure, means for conducting the substantially constant pressure fluid from said source to said first chamber, restrictive passage means connecting said first and second chambers to transmit fluid to said second chamber, and an engine speed responsive mechanism normally hydraulically connected to said governor valve means for controlling the fluid pressure in said second chamber and for effecting a mechanical connection with said governor valve means following a predetermined change of fluid pressures in said first and second chamber relative to each other.

4. An engine speed governor as claimed in claim 3 wherein said engine speed responsive device is arranged in substantially coaxial relation with said governor valve means.

5. In a fuel feed and power control system for an internal combustion engine, a fuel conduit for conducting fuel to the engine, a fuel metering restriction in said conduit, reciprocal governor valve means for controlling the flow of fuel through said restriction, said valve means including first and second valve elements directly responsive to fluid pressures, a regulated fluid pressure source containing fluid at a first pressure communicating with said valve element, restrictive passage means operable to transmit fluid from said first to said second valve element at a second pressure, control means for controlling the level of said second pressure, with said control means including a servo control valve operative with a servo orifice member for controlling the movement of said valve means, said control means including a housing member for said servo valve, with said housing member being adapted to move said orifice member in the event said servo valve becomes inoperative with regard to controlling the movement of said valve means, and an engine speed responsive mechanism connected to said control means for maintaining a given pressure difference between said first and second fluid pressures during equilibrium operation of the engine at any given speed.

6. Control apparatus comprising: a housing having an interior chamber formed therein; a differential area piston member having a large and a small area piston element; said differential area piston member operative to divide said chamber into first and second compartments on opposed sides of said piston member; said small area and large area piston elements being spaced at opposed piston sides to communicate with said first and second compartments respectively; a high pressure control fluid source; first passage means interconnecting said source and said first compartment; constant pressure regulating means disposed in said first passage and operative to regulate the control fluid pressure supplied to said first compartment to a substantially constant value; second passage means including a flow restriction therein formed in said differential area piston member to interconnect said first and second compartments and provide servo control fluid to said second compartment; an elongated stem member secured to said large piston element and movable therewith; said stem member extending through and exteriorly of said second compartment; third passage means formed within said elongated stem having a first opening formed in said stem within said second compartment; said third passage means having a second opening formed in said stem exteriorly of said second compartment at the end of said stem to provide a servo control orifice; and a servo control valve member operative with said servo control orifice to control the flow from and pressure of control fluid in said second compartment and thereby control the pressure balance which controls the motion of said differential area piston member.

7. Control apparatus as claimed in claim 6 wherein said servo control valve member is of the half-ball type; a cup shaped member for positioning said half-ball servo valve; said cup member including lip projections engageable with said elongated stem member to mechanically position said differential area piston in event of loss of fluid pressure in said second compartment.

References Cited in the file of this patent
UNITED STATES PATENTS

| | | |
|---|---|---|
| 162,782 | Westinghouse | May 4, 1875 |
| 991,230 | Noyes | May 2, 1911 |
| 1,339,939 | Alter | May 11, 1920 |
| 2,371,793 | Bourland | Mar. 20, 1945 |
| 2,466,358 | Besserdich | Apr. 5, 1949 |
| 2,644,513 | Mock | July 7, 1953 |
| 2,646,813 | Mueller | July 28, 1953 |
| 2,669,973 | Parker | Feb. 23, 1954 |
| 2,711,158 | Leduc | June 21, 1955 |

FOREIGN PATENTS

| | | |
|---|---|---|
| 111,487 | Germany | June 23, 1900 |
| 309,307 | Germany | Nov. 16, 1918 |
| 556,079 | France | Apr. 6, 1923 |